United States Patent [19]
Bartholet et al.

[11] Patent Number: 4,757,496
[45] Date of Patent: Jul. 12, 1988

[54] DISTRIBUTED TELEPHONE SYSTEM

[75] Inventors: Chauncey I. Bartholet, Scarsdale; Joseph Hardy, Bedford, both of N.Y.

[73] Assignee: Bard Technologies, Bedford, N.Y.

[21] Appl. No.: 852,171

[22] Filed: Apr. 15, 1986

Related U.S. Application Data

[63] Continuation-in-part of Ser. No. 628,744, Jul. 9, 1984, Pat. No. 4,646,296.

[51] Int. Cl.$^4$ .............................................. H04J 3/16
[52] U.S. Cl. ...................................... 370/85; 370/95; 370/124
[58] Field of Search .................. 370/124, 95, 89, 69.1, 370/85, 86; 379/113, 112, 137, 337, 381

[56] References Cited

U.S. PATENT DOCUMENTS

| | | | |
|---|---|---|---|
| 3,548,106 | 12/1970 | Ross et al. | 370/95 |
| 3,573,379 | 4/1971 | Schmitz et al. | 370/124 |
| 3,591,724 | 7/1971 | Yaku et al. | 379/137 |
| 4,020,289 | 4/1977 | Anderson | 370/124 |
| 4,107,471 | 8/1978 | Reed | 370/124 |
| 4,262,171 | 4/1981 | Schneider et al. | 370/124 |
| 4,339,816 | 7/1982 | Reed | 370/124 |
| 4,373,183 | 2/1983 | Means et al. | 364/200 |
| 4,513,413 | 4/1985 | Gorman et al. | 370/124 |
| 4,521,881 | 6/1985 | Stapleford et al. | 370/124 |

OTHER PUBLICATIONS

"Putting Broadband into Perspective", Dec. 1984, pp. 67-68.

"Performance issues in local-area networks" by W. Bux, vol. 23, No. 4, 1984, pp. 351-374.

Primary Examiner—Douglas W. Olms
Attorney, Agent, or Firm—Nixon & Vanderhye

[57] ABSTRACT

A communication system is provided for the interconnection of telephones and other instruments capable of communicating via the voice spectrum, the system providing a single transmission line such as a coaxial cable by which full duplex communication is provided between any pair of telephones. Each instrument is coupled to the transmission line by a control unit which includes computer operated transceiver equipment for paging other ones of the control units to initiate a telephonic communication. Each control unit is provided with an identification number and circuitry for recognizing the identification number contained within a paging signal so as to initiate a response. In a separate spectral portion of the transmission line, there are provided sets of analog communication channels each of which has upper and lower spectral portions to provide two-way communication in opposite directions between a pair of telephones engaged in communication. A transmitter and a receiver in each of the control units is provided for the communication of analog signals of both voice and data via the voice channel, each control unit including circuitry for tuning the transmitter and the receiver to the selected channel in accordance with digital data transmitted via the transmission line and specifying a selected one of the voice channels.

24 Claims, 7 Drawing Sheets

| LINE N(1) | STATUS | CID | CHANNEL | TYPE | RING | ... |
|---|---|---|---|---|---|---|
| LINE N(2) | STATUS | CID | CHANNEL | TYPE | RING | ... |
| LINE N(3) | STATUS | CID | CHANNEL | TYPE | RING | ... |
| ⋮ | | | | | | |
| LINE N(N) | STATUS | CID | CHANNEL | TYPE | RING | ... |

| CH(1) | STATUS |
|---|---|
| CH(2) | STATUS |
| CH(3) | STATUS |
| CH(4) | STATUS |
| CH(5) | STATUS |
| ⋮ | |
| CH(N) | STATUS |

| SU | SENDING LINE # | LINE STATUS | CHANNEL # | CHANNEL STATUS |
|---|---|---|---|---|

DISTRIBUTED TELEPHONE SYSTEM

CROSS-REFERENCES TO RELATED APPLICATIONS

This is a continuation-in-part of application Ser. No. 628,744, filed July 9, 1984 which issued on Feb. 24, 1987 as U.S. Pat. No. 4,646,296.

BACKGROUND OF THE INVENTION

This invention relates to telephone systems for transmission of both voice and data and, more particularly, to a system wherein all telephone sites are interconnected by a common coaxial transmission line with switching and routing functions being performed by on-site control units which couple the telephones to the transmission line.

Presently, there are two basic types of telephone and data switching systems in use. The first type of system, which is the most widely used, incorporates central office switching. Such systems include the private branch exchange (PBX) which operates in the manner of a miniature central office. The second type of system is the local area network (LAN) which employs digitized voice and data transmission over a common cable.

The central office or PBX type of system is characterized by the use of individual wires, such as a pair of wires or group of such pairs, to connect each telephone instrument to a central switch. The overall configuration of such a system has the form of a star with the central office switching at the middle and the individual telephone instruments being connected to the central office by their respective telephone lines. The central switch and its control equipment performs all of the necessary management functions for providing the voice and data communications, thereby to allow individual telephone instruments to communicate with any other one of the telephone instruments. In recent years, the telephone management functions, whether in a central office or in an on-site PBX, have been expanded to include a variety of sophisticated capabilities such as call forwarding, call camp-on, conference calling, call back, auto dial, and least-cost routing as well as providing statistical information for efficient management of the system.

The major disadvantages of the central switching approach arise from the dependence on the star wiring configuration, this resulting in an excessively large size and complexity to the central switch for the interconnection of thousands of telephone instruments. The star wiring configuration is not economical for small telephone systems. Furthermore, the star wiring configuration requires very large amounts of wire because the telephone line must extend from the location of each telephone instrument all the way to the central switch. Changes in the instrument may require new wiring as is the case wherein a call director instrument is substituted for a single line instrument necessitating the installation of multiple telephone lines. If the original single line instrument were re-installed, the surplus wire would be useless.

Other disadvantages arise with the star wiring configuration in that dependence on the central switch causes system fragility because a switch failure shuts down the entire system. If more advanced functions are to be accommodated with the central switch, the switching equipment must contain a complex and powerful computer and very sophisticated software to manage the thousands of instruments simultaneously, as well as to switch voice traffic among them. Such complexity further increases the fragility of the central office switch.

The LAN incorporates a number of interconnected on-site PBX's via a common cable capable of high speed data transmission. Each PBX is substantially smaller than the usual central office switch. The resulting system has the form of clusters of star-wired PBX units connected to each other by a common cable network which may be configured in either the shape of a ring or a star configuration. While such a system may employ somewhat less wire than a central office system accommodating the same number of instruments, the system suffers, essentially, from the same disadvantages as the aforementioned central office system. Although each PBX unit is smaller and therefore less complex than the central office system, the PBX unit must be provided with the necessary functions to permit the unit to coordinate and connect with other ones of the PBX units.

Another approach to the design of a LAN has been the use of a common cable to physically connect individual instruments or data terminals. Significantly, these systems have all relied on digital signal processing implementations to allow the multiplexing of both voice and data signals in high speed transmission bands of the common cable. Such digital signal processing has limited the practical capacity of the cable to a few hundred simultaneous conversations, in contrast with a desired capacity of carrying tens of thousands of conversations. The poor utilization of the digital approach results in such impracticality that the LAN's have been used primarily to carry high speed data traffic instead of voice communication.

Attempts have been made to enlarge the signal-carrying capacity of the cable by frequency division wherein plural transmission bands are provided to carry digital signals with the bands being spaced apart along the frequency spectrum. Such frequency division adds complexity to the coordinating and the connecting of communications among the plural transmission bands, thereby rendering such a system to be impractical for voice transmission. Additionally, broadband telephone transmission devices have heretofore required manual adjustment of their transmitting power levels to insure that all signals received on the common cable are of substantially the same strength. While the deployment of large numbers of such broadband devices would be desirable in the use of a telephone system, the manual adjustment of power levels would render such deployment impractical.

SUMMARY OF THE INVENTION

The foregoing disadvantages are overcome and other benefits are provided by a telephone system which, in accordance with the invention, is constructed with a transmission line that connects with the site of each telephone in the system. Preferably, a coaxial cable is employed as the transmission line. Connection of each telephone to the coaxial cable is accomplished with the aid of an intelligent control unit which controls all switching and routing of communication between the telephone and other telephones of the system.

Both conversation and control signals are communicated via the coaxial cable. Voice and data signals in analog format are transmitted between telephones via any one of a set of relatively narrow bandwidth channels within the relatively broad frequency passband of the cable. A single channel of relatively wide bandwidth is reserved for the transmission of control signals in digital format.

The system comprises many control units with one control unit being provided at each site. The control units are identical to each other. Each control unit can be employed with a telephone handset or other source of telephonic signal such as a facsimile transceiver for the the transmission and reception of picture information. Each control unit includes a microcomputer, two transmitters and two receivers. One of the transmitters and one of the receivers are used for the transmission and reception of radio-frequency (RF) narrow band telephone signals for voice and data communications. The second transmitter and the second receiver are used for wide band RF transmission and reception of control signals generated by the control units for the switching and the routing of the telephone signals on the narrow bandwidth channels.

The microcomputer is programmed to perform the various operations necessary to effect the various functions to be provided by the system, this programming including central-office channel selection and switching functions presently employed both in central offices and private branch exchanges. If desired, the system can utilize an existing two way coaxial cable system currently in use for the transmission of cable television or other communications. In particular, the microcomputer incorporates memory for storing the use and availability of the narrow band channels, and for selecting one of the channels in accordance with a preestablished protocol in response to a request to initiate a telephonic communication. The microcomputer also generates a data control word including an identification number of the telephone site which is to be called. The control word is received by all control units of the system, and the control unit at the desired site responds by way of a further control word identifying the channel to be utilized in the communication. In the event that the telephone at the desired site is in use (line is busy), or in the event that no person answers the phone, other control words are transmitted by way of response to indicate the condition of the telephone. It is noted that all control units receive all messages transmitted along the control signal channel, including channel usage, such information being most useful in the performance of more elaborate functions such as conference calling.

BRIEF DESCRIPTION OF THE DRAWING

The aforementioned aspects and other features of the invention are explained in the following description taken in connection with the accompanying drawing wherein.

DETAILED DESCRIPTION

Figure 1:
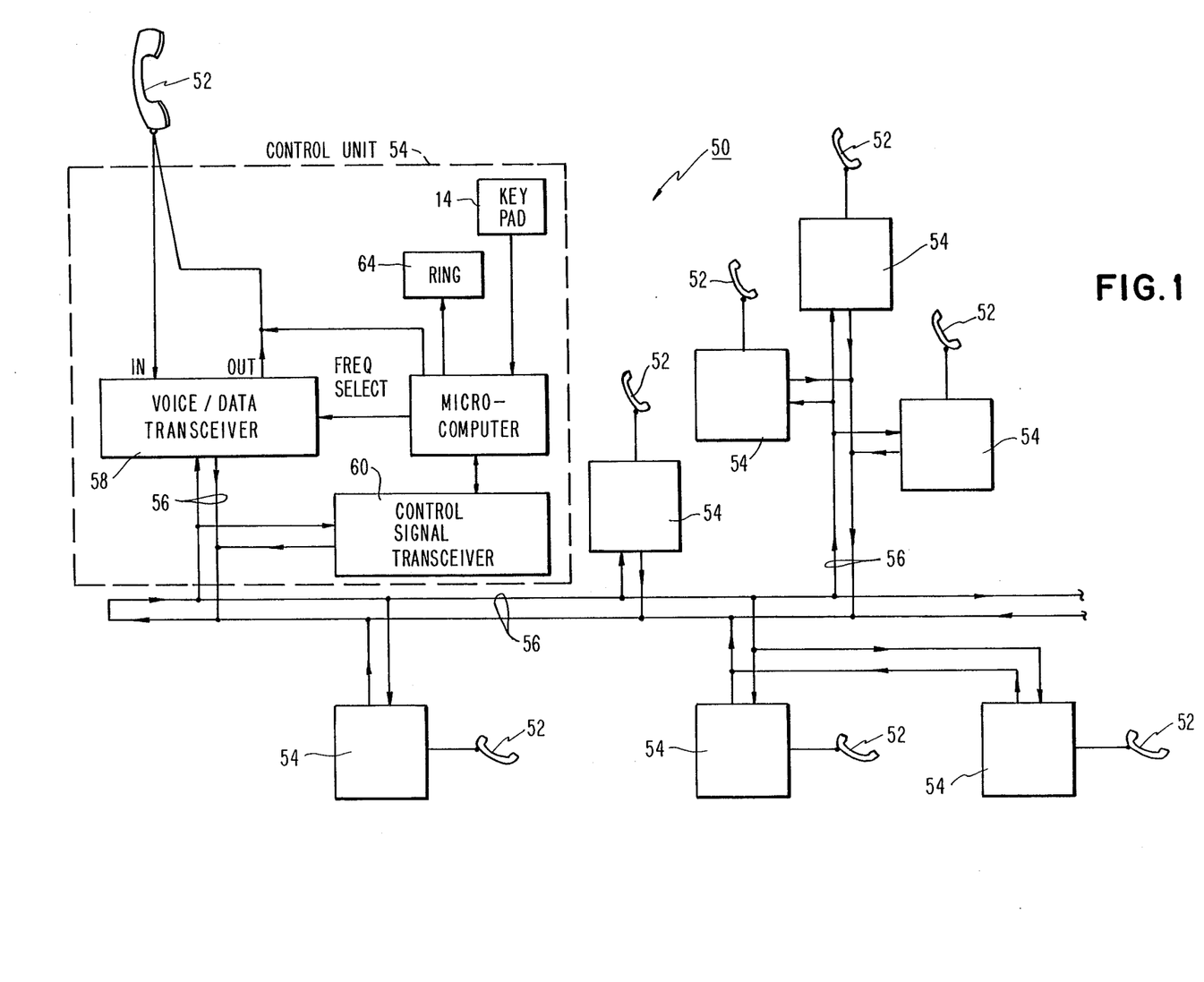
FIG. 1 shows the configuration of the system of the invention including a set of telephone instruments coupled by a corresponding set of control units to a common transmission line.

With reference to FIG. 1, there is shown a telephone system 50 constructed in accordance with the invention. The system 50 includes a set of telephone handsets 52, each of which is connected by a control unit 54 to common transmission line 56. Each control unit 54 includes a transceiver 58 for the reception and transmission of voice/data signals and a transceiver 60 for the transmission and reception of control signals. Signals of a handset 52 are converted to RF signals by the transceiver 58, the RF signals then propagating along the transmission line 56 to all of the control units 54. In one of the control units 54, the transceiver 58 is tuned to the frequency of the RF signal and, in that control unit 54, the transceiver 58 receives the RF signal and translates the signal back to audio frequency for reception by the handset 52 connected to that control unit 54. The transmission line 56 has a bandwidth which is sufficiently wide to carry many channels, each of which is at a separate portion of the frequency spectrum, and each of which can carry a voice conversation between a pair of the control units 54. In addition, the bandwidth of the transmission line 56 is sufficiently wide to incorporate a broad band channel having sufficient bandwidth for the propagation of digital control signals between the transceivers 60 and the respective control units 54. The transmission line 56 may be a coaxial cable or waveguide for the use of RF signal or, may be fabricated as a light pipe for the propagation of optical signals in which case the transceivers 58 and 60 would have suitable well-known devices for the conversion of electrical signals to optical signals. In the preferred embodiment of the invention, the transmission line 56 comprises a coaxial cable such as that utilized for the two way transmission of cable television programs.

In the use of the system 50, control signals are transmitted along the line 56 to initiate a telephonic communication between a calling party, or sender of the message, to another telephone or target which is to receive the message. It is noted that while handsets 52 are shown by way of example, it is to be understood that communication can be maintained between other devices such as facsmile in which signals are generated within the audio spectrum for transmission over the usual telephone channel. As will be described in further detail, hereinafter, the control signals transmitted between the transceivers 60 are used for tuning the transceivers 58 to a common channel so that persons located at the sender site and the target site can converse with each other. In order to initiate a conversation, each control unit 54 is provided with an identification number. Thus, when a sender wishes to call a target, the control signal transmitted by the sender transceiver 60 includes the identification number of the control unit 54 associated with the target.

Figure 2:
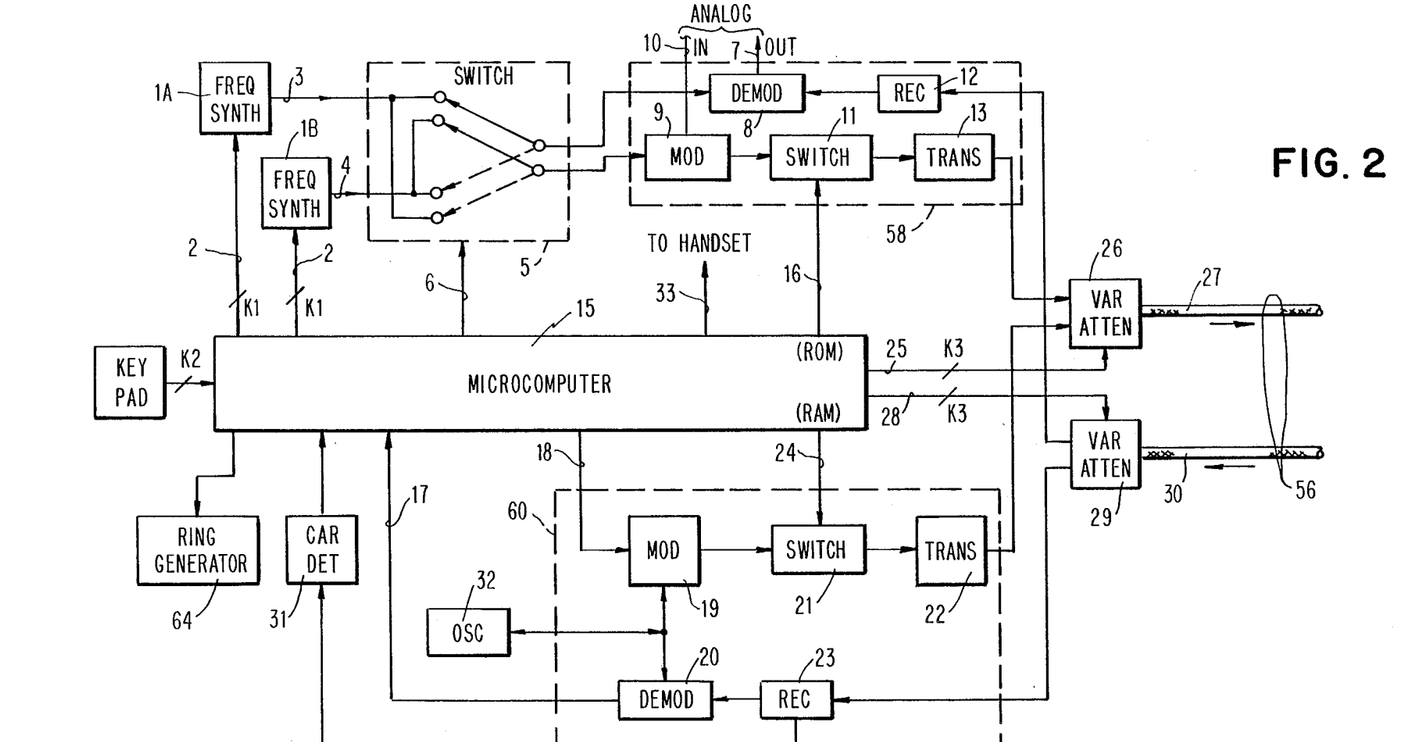
FIG. 2 is a block diagram showing components of a control unit of FIG. 1.

Referring also to FIG. 2, there is provided a more detailed description of components of the control unit 54. Each control unit 54 comprises two frequency synthesizers 1 which are further identified by the legends A and B such that the synthesizer 1A generates a carrier frequency in the upper half of a voice/data communication channel of the line 56 for the transmission of a message in one direction between the parties; the synthesizer 1B generates a carrier frequency at the lower half of the selected communication channel for transmission of the message in the reverse direction between the two parties. Thereby, by the use of the two carriers within the same communication channel, full duplex communication is attained. Typically, a voice/data spectrum has a bandwidth in the range of 3000 hertz (Hz) to 3500 Hz. Two of the foregoing voice spectra are incorporated within a single communication channel to provide for the full duplex capability, the center frequencies of the two spectra being spaced apart in a range of 7 kilohertz (kHz) to 15 kHz with a nominal value of 10 kHz being utiized to inhibit crosstalk between the two spectra of the communication channel. As will be shown with reference to FIG. 4, each of the synthesizers 1 incorporates digital circuitry which is responsive to a multiple-bit digital signal provided by a set of K1 frequency-data input lines 2.

Each control unit 54 further comprises a selector switch 5 connected by lines 3 and 4 to the synthesizers 1A–1B respectively. The switch 5 is operated in response to a signal on a control line 6. The switch 5 provides the capability of selecting either the upper or lower carrier frequency to be utilized for sending or receiving a message in accordance with a protocol to be described hereinafter.

The voice/data transceiver 58 in each control unit 54 comprises a demodulator 8 and a modulator 9 which connect with the earpiece and mouthpiece, respectively, of handset 52.

Also included within the transceiver 58 are a switch 11, a receiver 12 and a transmitter 13. RF signals coupled to the transceiver 58 by the transmission line 56 are received by the receiver 12, the RF signals then being demodulated by the demodulator 8 and then outputted along line 7 to be heard by the handset 52. Signals spoken into the handset 52 are inputted by a line 10 to the modulator 9 which then modulates the telephone signal onto a carrier. The modulated carrier signal produced by the modulator 9 is coupled by the switch 11 to the transmitter 13 for transmission by the transmission line 56 to a distant control unit 54 for communication with a distant handset 52. With the position of the switch contacts of the switch 5 as portrayed in FIG. 2, the carrier frequency produced by the synthesizer 1A is employed by the demodulator 8 in the demodulation of incoming RF signals while the carrier frequency produced by the snythesizer 1B is employed by the modulator 9 and the generation of the outgoing RF signal. Typically, the modulation utilized by the demodulator 8 and the modulator 9 is phase modulation, it being understood that other well-known forms of modulation may be utilized if desired.

The control unit 54 further comprises a keyboard or keypad 14 and microcomputer 15, the keypad 14 being used by the sender party to enter the identification number into the computer 15 for the target party which is to be called. The computer 15 is coupled by the foregoing lines 2 and 6 respectively to the synthesizers 1 and the switch 5, and is also coupled by a control line 16 to the switch 11 for initiating and terminating the connection of analog signals to he input terminal of the transmitter 13. The transceiver 60 for the transmission and reception of control signals is coupled to the microcomputer 15 by lines 17 and 18, the line 17 coupling incoming control data to the microcomputer 15, while control data is outputted from the microcomputer via line 18 to the transceiver 60.

The transceiver 60 comprises a modulator 19, a demodulator 20, a switch 21, a transmitter 22 and a receiver 23. The components of the transceiver 60 operate as do the corresponding components of the transceiver 58, except that the components of the transceiver 60 operate at a single carrier frequency. The modulator 19 and the demodulator 20 operate with FSK (frequency shift keying) or another well-known form of modulation for the transmission of digital data along the transmission line 56. A control line 24 from the microcomputer 15 operates the switch 21 to initiate and terminate the transmission of digital signals by the transmitter 22. Control data signals initiated by the microcomputer 15 are modulated onto a carrier by the modulator 19 and transmitted by the switch 21 and the transmitter 22 to the other control units 54 of the system 50. Control data signals emanating from other ones of the control units 54 of the system 50 are received at the receiver 23 and demodulated by the demodulator 20 to be applied to the microcomputer 15.

Signals coupled between the transmission line 56 and each of the transceivers 58 and 60 are connected via variable attenuators 26 and 29, the attenuators 26 and 29 being of a well-known form for attenuating RF signals in response to multiple-bit digital signals applied via lines 25 and 28 from the microcomputer 15 to the attenuators 26 and 29, respectively. Connection between the attenuator 26 and the transmission line 56 is made by coaxial cable 27, and connection between the transmission line 56 and the attenuator 29 is made by coaxial cable 30. The attenuator 26 is used for adjusting the intensity of signals transmitted by the transceivers 58 and 60 to a suitable amplitude for reception by other ones of the control units 54. The attenuator 29 is utilized for adjusting the intensity of signals received from other ones of the control units 54 to a suitable signal intensity for reception by the transceivers 58 and 60.

In view of the fact that all of the control units 54 transmit over the same transmission channel, with respect to the transmission of the control data signals, each microcomputer 15 monitors the transmission line 56 for the presence of control data signals of other ones of the control units 54 prior to the generation and transmission of a control data signal. The monitoring of the transmission line 56 is accomplished by means of a detector 31 of the carrier of such other transmissions, the carrier detector 31 being coupled to the receiver 23 for the detection of the carrier of such other control data signal transmissions. Also included within each control unit 54 is an oscillator 32 for providing the carrier to the modulator 19 and the demodulator 20 of the transceiver 60.

Figure 3:
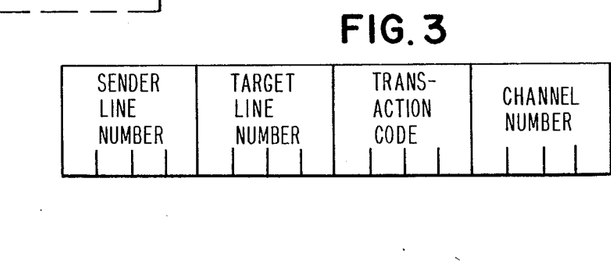
FIG. 3 shows a data control word format for signals communicated between control units.

The control data digital words transmitted between transceivers 60 of the various control units 54 has the form presented in FIG. 3. Such control word includes the line number identifying the sender, the line number identifying the target, a transaction code such as an indication that the party wishes to initiate a communication, and when required a channel number identifying the voice/data channel which is to be employed in communication between two of the control units 54.

In FIG. 2, a ring signal generator 64 provides a ring signal under command of the microcomputer 15. In addition, the microcomputer 15 can be employed for the introduction of audible signals to the handset 52 via the line 33, such as when the microcomputer 15 receives a data word via the transceiver 60 indicating that the telephone at the desired control unit 54 is in use.

Figure 4:
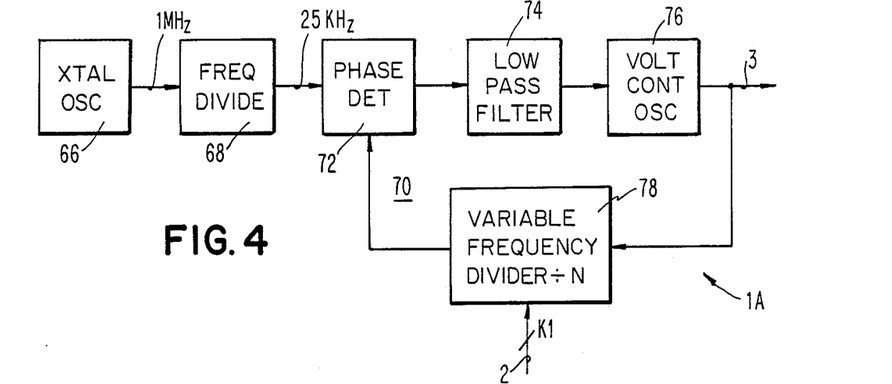
FIG. 4 shows a block diagram of a frequency synthesizer employed within the control units of FIG. 2.

FIG. 4 shows details in the construction of the frequency synthesizer 1A. The synthesizer 1B has the same form as the synthesizer 1A and, accordingly, only the synthesizer 1A will be described to facilitate the description of the invention. The synthesizer 1A comprises a crystal oscillator 66, a frequency divider 68, and a phase locked loop 70. The loop 70 comprises a phase detector 72, a low pass filter 74, a voltage controlled oscillator 76, and a variable frequency divider 78. By way of example in the construction of the synthesizer 1A, the oscillator 66 provides an output signal at a frequency of one megahertz which is applied to the divider 68. Typically, the divider 64 comprises a counter, as is well known, which counts cycles of the oscillator output signal. By way of example, the divider 68 has a division ratio of forty resulting in an output signal of 25 kHz which is applied to the phase detector 72 of the loop 70. The oscillator 76 applies an output signal to the divider 78 which operates in a manner analagous to that of the divider 68 to provide an output signal at a frequency of 25 kHz to the reference input terminal of the phase detector 72. The detector 72 provides a loop error signal proportional to the difference in phase between the input and reference signals, the error signal being filtered by the filter 74 in a well known manner to provide a control voltage to the oscillator 76. Thereby, the frequency of the oscillator 76 is locked to the frequency at the output of the divider 68 by a fixed ratio, N. The divider 78 comprises well known digital counting circuitry wherein the ratio, N, is established in accordance with digital words on the set of lines 2, these digital words being provided, as noted hereinabove, by the microcomputer 15. The output frequency on lines 3 and 4 can be raised in increments of the 25 kHz frequency appearing at the input to the phase detector 72.

Assuming, by way of example, that the output frequency on line 3 has a nominal value of 10 megahertz (MHz), then the aforementioned nominal value of 10 kHz between the transmission and reception portions of a voice channel can be accomplished by setting the synthesizer 1B to a frequency which differs from that of the synthesizer 1A by 10 kilohertz (kHz). Thereby, the carrier signals on lines 3 and 4 of FIG. 1 differ in frequency by a nominal value of 10 kHz. As the carrier frequencies are scaled upwards and downwards by variations in the value of N, the frequency difference between the carriers in lines 3 and 4 remains constant. This provides a desired frequency spacing between the transmitted and received portions of a voice communication channel over a useful set of channels. The digital words on lines 2 select the desired channel and also set the carriers for the transmit and receive portions of the voice channels. Digitally controlled frequency synthesizers, such as the synthesizer 1, are commercially available, such as that provided by Radio Shack in the citizen band radio model #TRC-451 or that provided by Heathkit in the "ham" radio model #HW-5400.

In operation, the microcomputer 15 includes read-only memory (ROM) and random access memory (RAM) with conventional input/output circuitry necessary to exchange information with other components of the control unit 54. The ROM contains the programming logic which allows the control unit 54 to interact with the other control units 54. The RAM provides facility for storing information, such as identification of the sender, unique to the control unit 54.

Upon installation of the system 50, each control unit 54 is provided with a unique "line" number, or identification number, which is entered into the microcomputer 15 via the keypad 14, to be stored in the RAM of the microcomputer 15. The keypad 14 may be of the standard form currently in use on pushbutton telephones. The line number is known to the users of the system 50 as the "telephone" number of the unit to be called as in any common telephone system. To facilitate an example in the use of the system 50, three of the control units 54 have been further identified by the letters X, Y and Z, these three units having line identifications as line 210, line 320, and line 430, respectively.

The placement of a call between unit X and unit Z, line numbers 210, and 430, respectively, would take place as follows. The control data receiver 23 in each of the units 54 receives, over the control data channel, any words transmitted by other ones of the control units 54. When a user at unit X wishes to contact unit X to unit Z, the user at X enters the number "430" into his microcomputer 15 via the keypad 14. The microcomputer 15 then checks the detector 31 for the presence of a carrier on the control data channel.

When no carrier is detected, the microcomputer 15 activates the switch 21 to transmit a control data word, having the format disclosed in FIG. 3, via the modulator 19 and the transmitter 22; thereafter, the microcomputer 15 turns off the switch 21 to terminate any further transmission. All of the units 54 receive the transmission from the sender via the transmission line 56.

In accordance with a feature of the invention, each of the units 54 maintains, in the computer memory RAM, a table of the busy/free status of all voice communication channels of the system 50. The microcomputer 15 in each unit 54 is also programmed to select, from the data received via the receiver 23, the information needed to maintain the status of other ones of the units 54. When the microcomputer 15 of unit Z receives the control data word transmitted by unit X, the microcomputer 15 of unit Z can then process the "call request". The microcomputer 15 of unit Z then selects a currently free channel from the channel status table and transmits along the transmission line 56 a data control word containing the sender's line number (430 for unit Z), the target line number (210 for unit X), the transaction code for "accepting call", and the channel number to be used for the call.

Upon receiving this control data word, the microcomputers 15 in all of the control units 54 designate the selected channel as being busy. Also, the microcomputer 15 in unit X sets the frequency-data input lines 2 for the frequency synthesizers 1A-1B to the selected channel.

In accordance with a further feature of the invention, a protocol is established for each pair of units 54 communicating with each other wherein each unit 54 of the pair of control units 54 sets its selector switch 5 for transmission on the upper half of the voice/data channel if its "telephone line" number is higher than that of the other unit of the pair of control units 54, and to receive on the upper half of the voice/data channel if the line number of the control unit 54 is lower than that of the line number of the other unit of the pair of control units 54. In the foregoing example, unit Z has a higher number than unit X. Accordingly, unit Z will transmit on the upper portion of the selected communication channel to unit X which is tuned to receive on the upper portion of the communication channel. Unit X will transmit on the lower portion of the communication channel to unit Z which will receive on the lower portion of the communication channel. This provides for the full duplex transmission/reception between the units X and Z.

As the two control units 54, namely the units X and Z, communicate with each other via the voice/data channel by use of the transceiver 58, the two units can communicate simultaneously via the control data channel by the transceivers 60. This capability of control data word exchange between autonomous control units 54 even while full duplex conversations, voice or data, are taking place under control of programming in the microcomputers 15 allows the implementation of advanced PBX functions, and also permits each control unit 54 to maintain system status tables such as those required for multiple-line telephones as well as maintaining the status of each communication channel.

With respect to the control of power levels by use of the attenuators 26 and 29, it is noted that a new output power setting can be transmitted by a data control word utilizing the transceivers 60. A requested increase or decrease in transmitted power can be communicated by use of the appropriate transaction code in the format of FIG. 3. Thereby, power of a remote control unit 54 can be increased or decreased if necessary to improve communication with another control unit 54.

Figure 5:
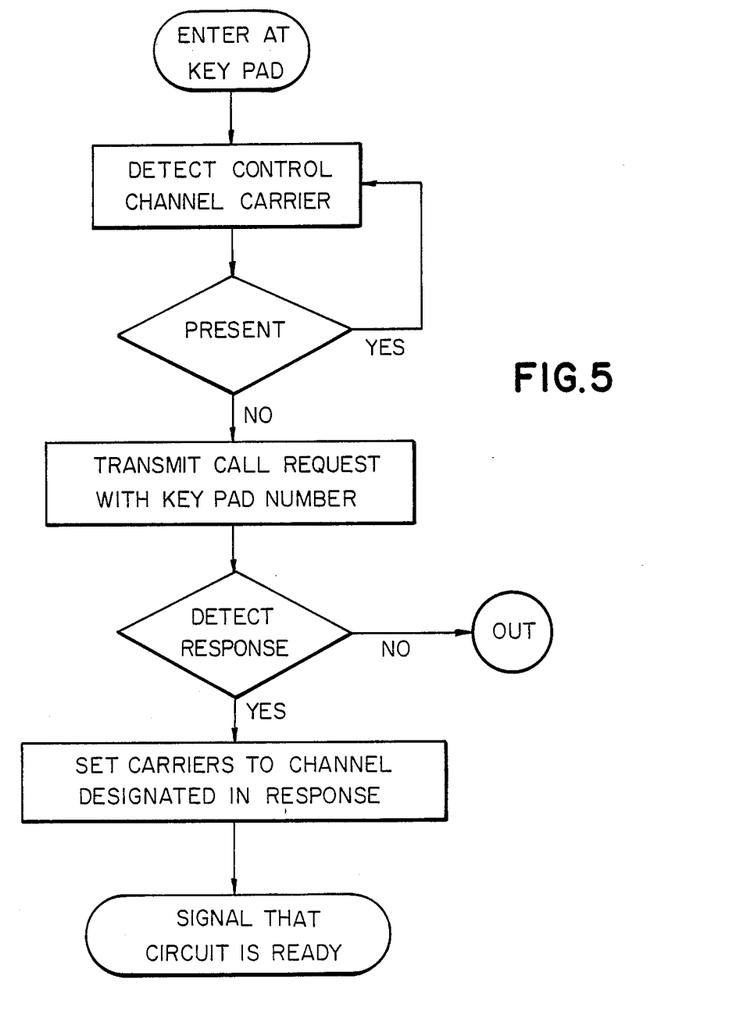
FIGS. 5 and 6 are flow charts showing the operation of a microcomputer in the control unit of FIG. 2.

In FIG. 5, the flow chart describes the operation of the microcomputer 15 in the control unit 54 of the sender party requesting a communication. The telephone number is entered at the keypad to alert the microcomputer 15 that a telephone call to a remote instrument is desired. Thereupon the microcomputer 15 samples the output signal of the detector 31 to determine whether a carrier is present on the control data channel. The microcomputer 15 continues to monitor the control data channel until it is free of the presence of a carrier from some other control unit 54. Thereupon the microcomputer 15 initiates a control word with the format of FIG. 3 to transmit a call request to all of the control units 54. The control unit 54 having the designated telephone number, the target party, then transmits a response to the sender. In the event that the microcomputer 15 does not receive a response, then the sending party is alerted of a failure to communicate, whereupon the sending party could again dial the telephone number. In the event that a response is received, such response contains the identification of the channel to be used for the communication and, accordingly, the microcomputer 15 commands the frequency synthesizers to set the carriers for the modulator and demodulator of the transceiver 58 to the appropriate channel. Then, the sending party can communicate by speaking into the handset 52.

Figure 6:
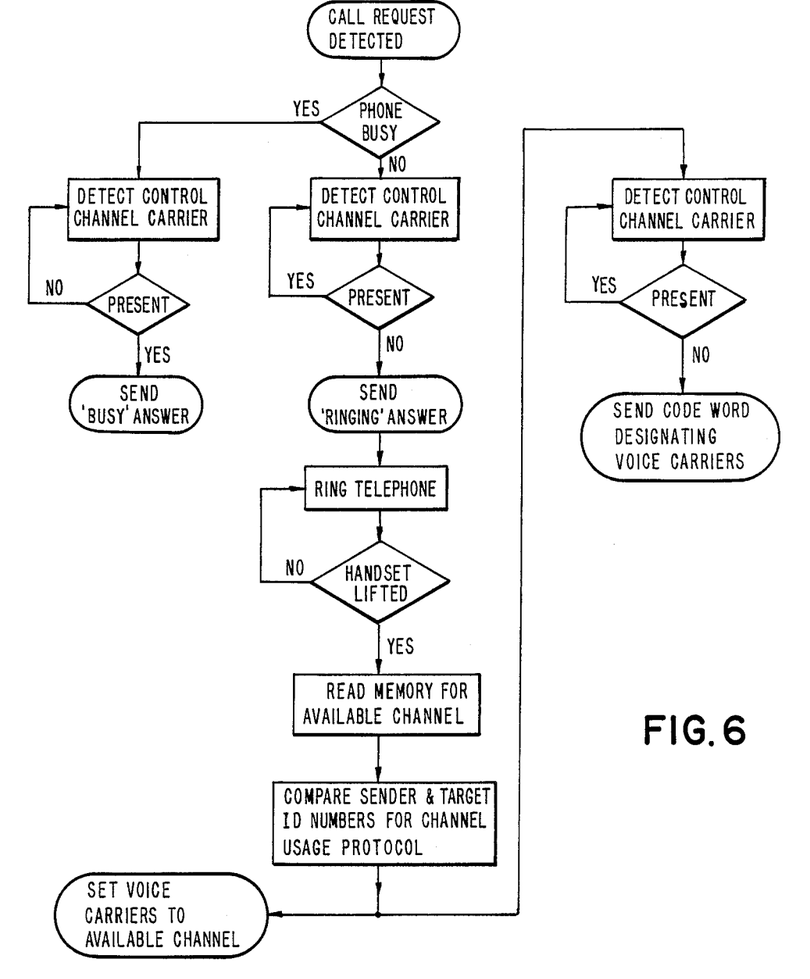

The flow chart of FIG. 6 describes the operation of the microcomputer 15 of the target party. An incoming control word having a transaction code indicating that a telephone communication is desired, and also having a target line number is processed by the microcomputer 15 to determine whether the target line number is identical to that of the control unit 54. If the number is identical, then the control unit 54 is alerted by the microcomputer 15 to the fact that it is the target party with whom a telephone call has been requested and, accordingly, the microcomputer 15 verified if this unit is busy and if so sends a "busy" answer. If idle this unit's microcomputer 15 sends an answer indicating that this unit is "ringing" and then activates the generator 64 to ring. Such answers, in the form of control words, being transmitted only after a monotoring of the transmission line 56 determines that no other control units 54 are transmitting along the control data channel. In the event that the handset is lifted, then the target microcomputer 15 reads its memory, namely the RAM, to determine which voice/data channels are available and to select one such channel for the telephonic communication. The microcomputer 15 commands the appropriate frequencies from the synthesizers 1A-1B for the selected channel, and also transmits a control word to the sender party designating the selected communication channel. It is noted that the notification of the sending party of the desired channel is accomplished only after a checking of the transmission line 56 to determine whether any carrier is present from a communication of another control unit 54. The process of waiting for a free time slot on the control data channel insures that control information can be transmitted among the various control units 54 without any interference among the signals of the various control units 54.

In view of the foregoing description, it is apparent that the system of the invention presents a new approach to telephone switching and transmission. The inclusion within each control unit of a computer with memory and with a capacity for monitoring the status of the various communication channels provides intelligence to the cõntrol unit. The connection of the control units to a common coaxial cable introduces a wiring configuration such as that utilized in conventioal two-way cable television systems. Each control unit has sufficient intelligence and switching capability to connect itself to any other control unit to establish two-way communication. This is accomplished without any telephone central switching system and, accordingly, there is no such central switch in the system of the invention. Thereby, inefficencies associated in the operation of a star wiring configuration with a central switch are not present with the system of the invention and, in addition, the complexity and fragility of the central switch are eliminated. The voice transmissios are performed in an analog fashion rather than in the digital fashion which would require a much broader bandwidth and a time division multiplexing of the signals of the various conversations being carried by the telephone system. Accordingly, the system of the invention can carry many more conversations simultaneously, the number of simultaneous conversations being increased by an order of magnitude. A single digital transmission channel is employed for the coordination of the individual control units. Thus the system of the invention can perform all of the usual switching and transmission functions, as well as more advanced switching and transmission functions through the expedient of simply programming the microcomputer. The units can also adjust the power level of transmitted signals as required, and can also maintain data and statistics on the use of the various communication channels.

Figure 7:
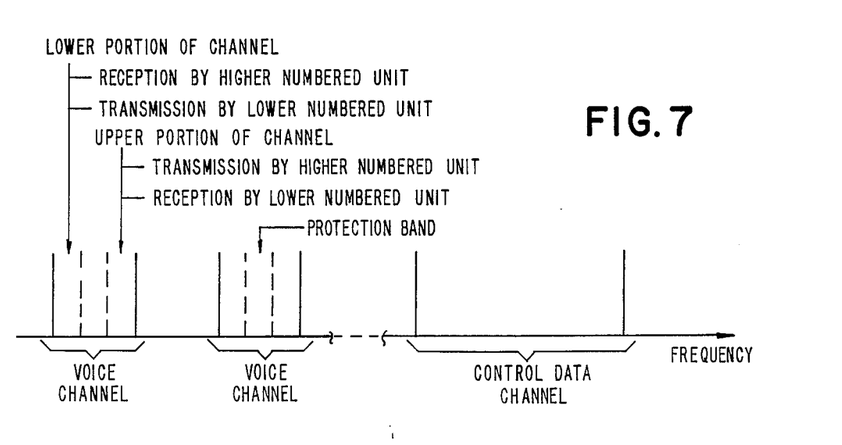
FIGS. 7 is a graph showing spectrum utilization.

With reference to FIG. 7, there is shown a graph portraying the utilization of the frequency spectrum for the various voice/data channels and the control data channel. FIG. 7 shows two of the many voice channels and the control data channel. The bandwidth of a voice channel is substantially less than that of the control data channel. The channels carrying the voice and/or data are divided into an upper portion and a lower portion, with the two portions being spaced apart in the frequency domain by a protection band to inhibit crosstalk between signals propagating along the transmission line 56 (FIG. 1) in the upper portion and in the lower portion of the voice channel. The protocol for assignment of the foregoing portions of the voice channel for transmission and reception by one of the control units 54 (FIG. 1) is also shown in FIG. 7. In the upper portion of a voice channel, there is transmission of an analog signal by the control having the higher identification number, with the analog signal of the upper portion being received by the control unit having the lower identification number. Correspondingly, in the lower portion of the channel, there is transmission of an analog signal by the control unit having the lower identification number, with the analog signal of the lower portion being received by the control unit having the higher identification number. Thereby, FIG. 7 demonstrated the inventive feature of full duplex communication.

With respect to the installation of the system 50, a telephone and its control unit can be installed in a home, an office, and other locations where telephones are employed. The coaxial cable which serves as the transmission line may be supported on telepone poles or placed under ground. Each telephone with its control unit may be regarded as a station for the transmission and reception of information. The identification number identifies the station, and the interchanging of the handset, or the adding of additional stations does not alter the identification number. Also, the interposition of facsimile device for the transmission of pictorial data in lieu of the handset for the transmission of voice would not alter the identification number since it is the number solely of the control unit. All transmissions of a control unit, whether on a voice channel or a control channel propagate to all of the other control units in the system. Therefore, the initiation of a telephone call is in the nature of a paging of the desired party, which paging is "heard" by all parties. In the case of the control channel, only the control units having the called identification number respond. In the case of the voice channel, only the control unit which is tuned to the voice channel participates in the full duplex communication. The selection of the upper and lower portions of each voice channel to be designated for transmitted and received messages is accomplished in accordance with the protocol based on the relative magnitude of the identification numbers of the sender and target parties.

As mentioned above, the present invention provides a fully distributed telephone system with full PBX functions (including advanced functions such as autodial, redial, call forward/routing, call waiting, camp-on, message forwarding and display, hold, hunt groups, route on ring no answer, conference calling, least cost routing, break-in, intercom, priority calling and the like). Further details of the novel architecture in accordance with the present invention and a description of the manner in which telephone control units 54 are synchronized will now be presented.

Each control unit 54 shown in FIG. 1 is assigned a nominal "home line" preferably corresponding to an extension number (e.g., a combination of four digits such as 3344). In conventional telephone systems, every extension "line" corresponds to a physical wire pair. In the present invention, a "line" is simply a unique designation used to describe one or a group of control units 54. As described above, voice information may be directed to and from any "line" via any one of the voice channels provided by system 50.

In conventional telephone systems, more than one telephone unit may be connected to the same "line". For example, many homes have more than one "extension" connected to the same telephone wire pair. All such extensions have the same telephone number. In PBX system, it may be desirable to assign a particular telephone "line" to one telephone unit, while also connecting that "line" to several other telephone units (which may be considered "extensions" on the same "line"). For example, the direct dial "line" of a business executive is connected to the telephone unit(s) within the executive's office and also to the telephone unit of the executive's secretary. The telephone unit within the executive's office may be termed the "home" unit for the "line", and the telephone unit of the executive's secretary may be termed an "extension" on the same "line". The telephone unit of the executive and the telephone unit of the secretary may both include an indicator lamp which lights when the "line" is off-hook, and either may be used to make/answer calls on the "line".

It may be desirable to ring a bell or other ringing device in both telephone units when a call is received on the "line". Alternatively, it may be desirable to ring only the "home unit" (i.e., the telephone unit within the executive's office) when a call is received, and to route the call to the secretary's telephone unit (to cause that unit to ring) if the executive's unit does not go off-hook within a predetermined number of rings (this feature is known as "route on ring no answer"). Those skilled in the art are aware of many other variations and arrangements provided in conventional PBX systems to add versatility and usefulness. Such advanced PBX functions can be easily implemented by the system of the present invention due to its flexible message capabilities.

Each control unit 54 of preferred embodiment (see FIG. 2) stores and maintains, preferably in a random access memory internal to microcomputer (processor) 15, a Line Control Table 100 (see FIG. 8A) which enables the control unit to behave as an "extension" of one or more "lines". Line Control Table 100 serves two functions in the preferred embodiment: it designates which extension numbers each control unit 54 monitors; and it stores status and other information about the monitored lines.

Figure 8A:
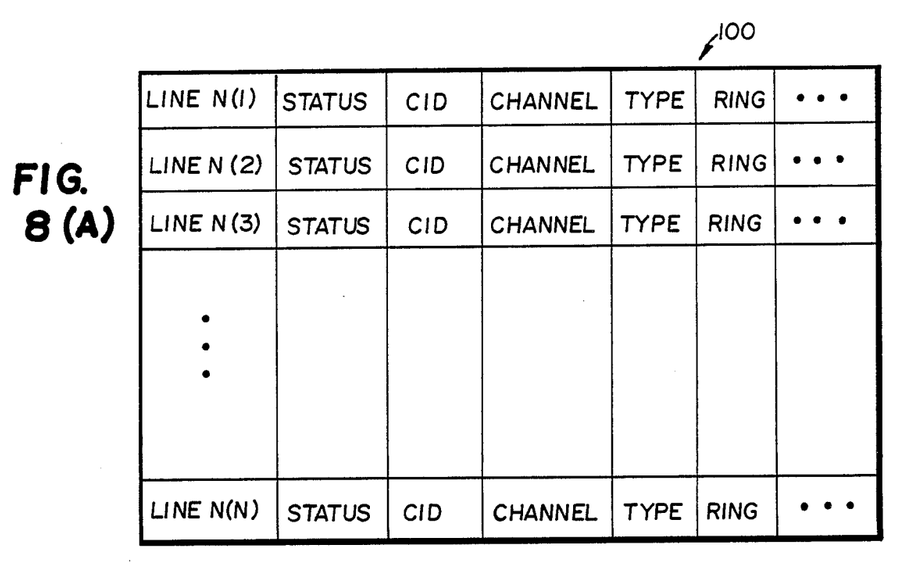
FIG. 8A is a schematic diagram of an exemplary Line Control Table maintained by microcomputer (processor) 15 shown in FIG. 2.

The exemplary Line Control Table 100 shown in FIG. 8A includes a "LINE" field, a "STATUS" field, a "CID" field, a "CHANNEL" field, a "TYPE" field and a "RING" field. A different "line" ("extension") designation is stored in the "LINE" field of each of the entries in Table 100. In the preferred embodiment, these "LINE" fields sotre 4-digit "line" numbers or designations which serves as unique "addresses" in system 50. Single or groups of control units 54 are designated by referring to the line numbers allocated to them (e.g., one or more control units may monitor "line" 3344, which line number serves as a unique address designating that unit or group of units).

The "STATUS" field of each entry of Line Control Table 100 stores one of two values: "idle" or "busy." Such "STATUS" fields indicate the status (in use or not in use) of the "line" designated by the information stored in the associated "LINE" field.

If a line is in use, the "CID" field associated with that line stores the number of the line connected thereto (in system 50, a line generally cannot be in use unless it is engaged in voice information exchange with another "line"). Similarly, the "CHANNEL" field associated with a line in use stores the voice channel number used to communicate information between the line and the further line identified by the "CID" field. The "CID" and "CHANNEL" fields associated with a line not in use are null.

The "TYPE" field contains one of two values in the preferred embodiment: "home" or "monitored". In the preferred embodiment, every "line" has one and only one "home" control unit 54, but may also be "monitored" by any number of additional control units. Some control units 54 may have no "home" lines while other control units may have several such "home" lines. Certain PBX functions affecting a particular line can be initiated only by the "home" control unit 54 of that line (e.g., it may be desirable to cause only a "home" unit of a line to ring in response to an incoming call on the line, and to merely flash a lamp for the control units which store the designation "monitor" in the "TYPE" field of an entry in their Line Control Table 100 associated with the "ringing" line). Exemplary Line Control Table 100 also includes a "ring" field associated with each entry which stores one of two values: "yes" (indicating that the associated line is ringing; and "no" (indicating that the associated line is not ringing). Additional fields may be provided in Line Control Table 100 to implement special functions (e.g., call forwarding, intercom, etc.).

The content of the Line Control Table 100 can be dynamically changed by the control unit 54. For exsample, the "status", "CID" and "CHANNEL" fields associated with a particular line are updated in accordance with the instantaneous status of that line (the manner in which this information is updated will be discussed in detail shortly). A control unit 54 preferably never changes certain information in its Line Control Table 100 (for example, the number of entries in the Line Control Table and the contents of the "line" fields of the entries), although even these parameters are variable (and are preferably set when the control unit 54 is initially programmed and installed).

Figure 8B:
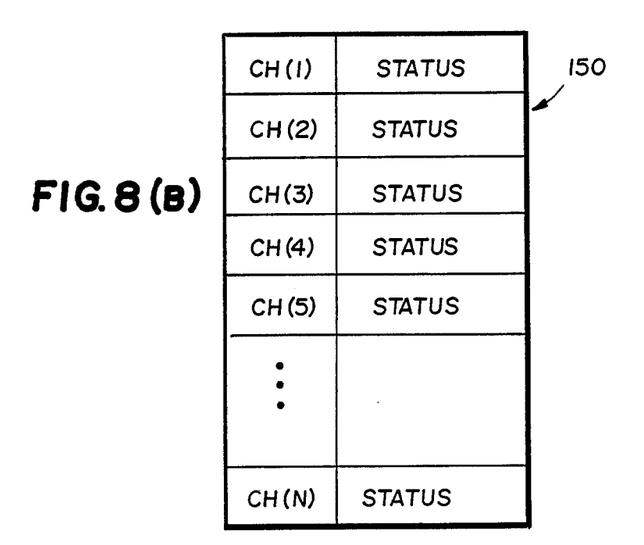
FIG. 8B is a schematic diagram of an exemplary Channel Status Table maintained by microcomputer (processor) 15 shown in FIG. 2.

As mentioned previously, each control unit 54 also maintains (in a random access memory internal to processor 15 in the preferred embodiment) a "channel status table" 150 (see FIG. 8B). Channel status table 150 in the preferred embodiment simply stores the status ("busy" or "idle") of each and every voice channel of system 50.

Versions of Table 100 and 150 are independently stored within each of control units 54, and are independently updated by the control units in response to messages broadcast over the control channel.

As mentioned previously, messages are transmitted over the control channel by control units 54 in the preferred format shown in FIG. 3. Each message includes at least a "transaction" code (e.g., ring, status update, terminate call, or the like); a "sender line number" (the number of the line the control unit 54 originating the message is to affect); a "target line number" (the designation of the control unit or group of control units intended to receive the message); and a "channel number" (the designation of the voice channel to be used for communicating voice information between the sender "line" and the target "line").

For example, suppose a first control unit 54 monitoring line number 2233 is placed "off-hook" in response to a received message from a further control unit monitoring line number 4567 initiating a call to line 2233. As discussed above, the proper response of the first control unit 54 is to sent a "ringing response" message (action code=RR) to line number 4567 originating the call. Such an exemplary message would appear as follows:

| 2233 | 4567 | RR | Channel # = 55 |

This exemplary message is transmitted by the first control unit 54 onto the system control channel and thus would be broadcasted to and received by every control unit 54 which is active and capable of receiving messages.

Figure 9:
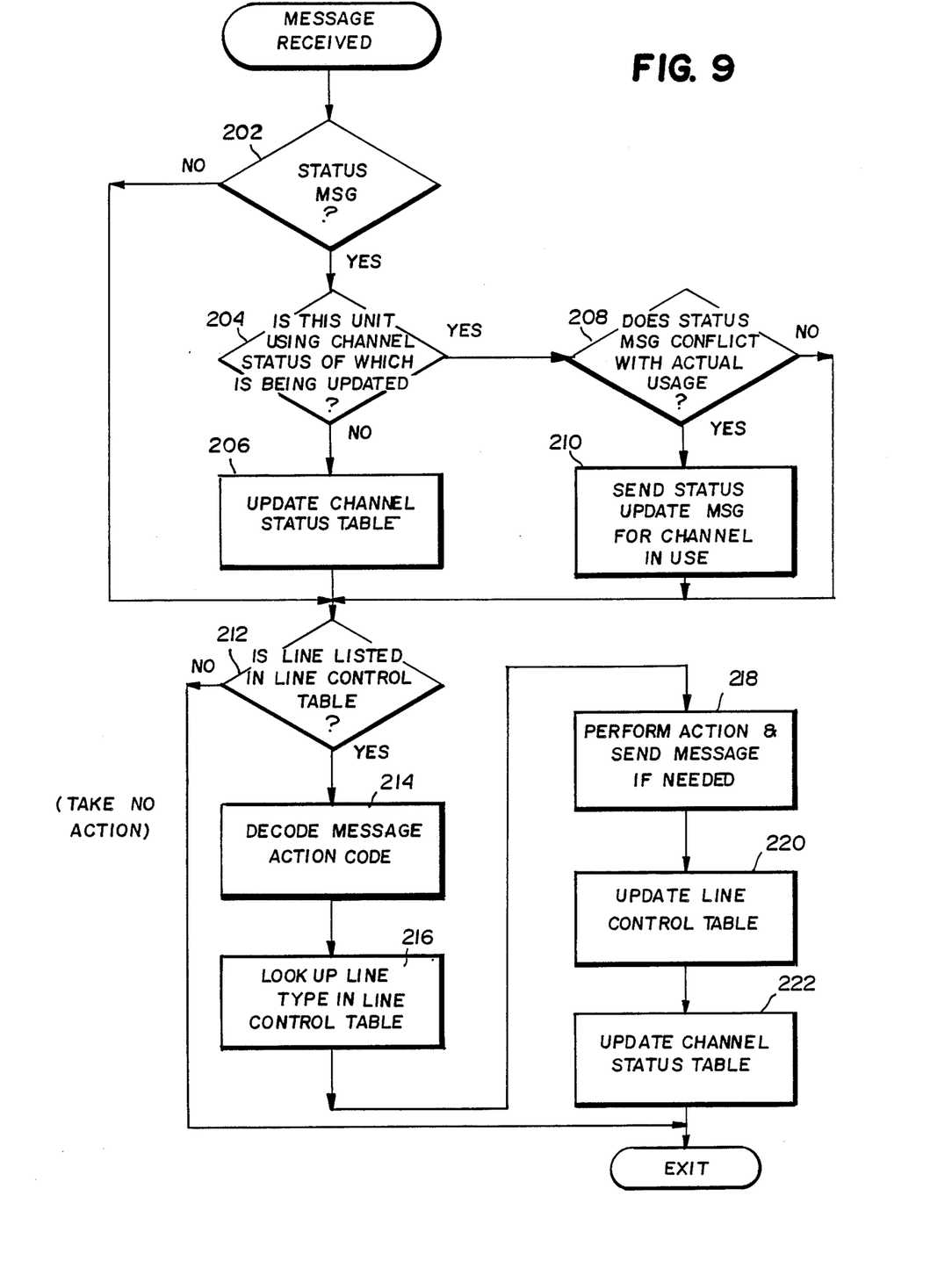
FIG. 9 is a flowchart of some of the exemplary program control steps performed by the microcomputer (processor) 15 shown in FIG. 2 when a message is received.

FIG. 9 is a flowchart of some of the exemplary control function steps performed by processor 15 of each control unit 54 of the preferred embodiment upon receipt of a message broadcast on the control channel.

Control units 54 inspect every received message to determine whether the status (idle or busy) of a channel is affected (decision block 202) by the message. If the received message does affect the status of one of the voice channels of system 50, the control unit 54 determines whether it is itself using the channel the status of which is being updated by the received message (decision block 204). If the control unit 54 is not using the updated channel, it simply updates its status control table 150 to reflect the new channel status (block 206).

As will be explained shortly, it is possible in the preferred embodiment for a control unit 54 not currently using or attempting to use a particular voice channel to transmit a message purporting to set or verify the status of the channel. If a control unit 54 using a voice channel receives a message purporting to set a status for that channel which conflicts with its own use (block 208), the receiving control unit transmits a "status update" message to correct the conflicting channel status information which has now been stored in every control unit 54 of system 50 (including the control unit which originated the incorrect message) in response to the prior, incorrect message (block 210). In this way, incorrect channel status information is promptly corrected for every control unit 54 of system 50. Moreover, each control unit 54 is able to independently maintain its own channel status table 150 and independently determine which voice channels are idle and which channels are busy.

After channel status table 150 has been updated, control unit 54 determines whether the received message affects either its "home" line or a line which it monitors (decision block 212) by comparing line number information contained in the received message to the "line" fields of the control unit Line Control Table 100. If neither the "sender line number" nor the "target line number" contained in the received message match a "line" field of the Line Control Table 100, the message does not affect any "home" or monitored line of the control unit, and no further action needs to be taken in response to the received message. On the other hand, if one or both of the "sender line number" and "target line number" fields of a received message match a "line" field of the receiving control unit 54 Line Control Table 100, the line control table is updated in accordance with the received message and/or the receiving control unit may be required to take other action (e.g., light an indicator lamp, send a responsive message, or the like) in response to the message.

If a match exists between one of the line numbers referenced by the received message and a "line" field of the Line Control Table 100 of the receiving control unit 54, the control unit inspects the action code field of the received message to determine what type of processing needs to be performed (for example, answer a call, ring a bell, disconnect, or the like) (block 214). Next, the entry (entries) of Line Control Table 100 corresponding to the line(s) referenced by the received message is (are) accessed to determine the precise action, if any, which should be performed in response to the received message (block 216). For example, if the received message action code specifies that a particular line number is to ring, the receiving control unit 54 writes a "yes" into the "ring" field of the entry of the Line Control Table 100 corresponding to the target line number field of the received message (assuming such an entry does, in fact, exist in the Line Control Table) and activates ring signal generator 64 to provide an audible ring signal. Line Control Table 100 may determine the "personality" of the control unit 54 within which it is stored and cause the control unit to perform appropriate actions (e.g., send a message if a message is needed) based on the action code of the received message and the information stored in its own Line Control Table 100 (block 218).

For example, suppose the action code of a received message indicates a call request to line 0006 and the Line Control Table 100 of receiving control unit 54 includes an entry having a "line" field=0006, a "status" field="idle," and a "type" field="home." The receiving control unit 54 performs the necessary processing to answer the incoming call, such as sending a "ring response" message to the sending line number indicating a positive response that the telephone is ringing, actuating its ring signal generator 64, and lighting an appropriate indicator light. As mentioned above, the "ring response" message is sent with the number of a free channel (selected from one of the free voice channels indicated by the channel status table 150 of the control unit 54) to be allocated for the call. The Line Control Table 100 and the channel status table 150 of control unit 54 are then updated to reflect the new activity, e.g., the entry corresponding to the selected channel is marked "busy" in the channel status table, and the line is marked in the Line Control Table as having a "busy" status, a "CID"=the line number initiating the call, and a "channel"=channel to be used for the call (blocks 220, 222).

If, however, the receiving control unit 54 contains an entry in its line control table 100 having a "line" field=0006 and a "type" field="monitor", the control unit does not need to perform any steps to process the received message (unless, for example, it is supported to ring along with the "home" unit of that line). If and when the "home" control unit sends a "ringing response" message, the control unit monitoring the affected line updates its Line Control Table 100 and channel status table 150 appropriately to indicate that the voice channel number selected by the "home" control unit is busy and line 0006 is busy on that voice channel communicating with the line originating the call.

Thus, each control unit of system 50 receives every message transmitted over the control channel, but processes only two types of messages—those messages which affect the status of a voice channel, and those messages which refer to a line number corresponding to an entry in the receiving control unit's line control table 100. Control units 54 simply ignore messages which do not affect lines not monitored by them (or affecting "home" lines), except to the extent that such messages contain channel status information. Each control unit 54 is accurately updated with the status of all of the components of system 50 relevant to its own operation and therefore remains in perfect synchronization while functioning completely independently of every other component in the system.

It is not necessary for each control unit 54 tyo maintain a complete list of the multiple occurrences of every line in the system 50. Moreover, the message protocol of the present invention does not require acknowledgements of every message, thereby reducing system message traffic and eliminating the need for multiple acknowledgements of a single message. The amount of processing time and processor memory resources devoted to Tables 100 and 150 are minimized, thereby increasing efficiency and decreasing equipment cost.

No centralized "master" status table is maintained in the preferred embodiment of system 50. Rather, each control unit 54 independently maintains tables containing only the control information relevant to its own operation. Sometimes, individual control units 54 may fail to receive one or more messages transmitted over the control channel of system 50, causing them to become unsynchronized with the remainder of the system. For example, a control unit 54 which is temporarily disconnected from system 50 will no longer be synchronized (even if it equipped with a non-volatile random access memory storing Tables 100 and 150) because it cannot update its stored table information in response to changes in line and channel status. Power failures can cause many control units 54 to go "off line" at once. When power is restored, the "off line" units all go back "on line" at about the same time, and all must quickly update their status information in order to operate properly.

The preferred embodiment of system 50 includes a facility distributed throughout the control units 54 of the system for maintaining the independent control units in synchronization with one another despite temporary failure of some or most of the control units.

In the preferred embodiment, ongoing resynchronization is accomplished through a "status update message." Each control unit 54 of system 50 periodically broadcasts a "status update control message" containing information specifying its own status (e.g., ringing, busy, idle, etc.). Each voice channel is also arbitrarily assigned to at least one control unit 54 given the responsibility of updating the status of its assigned voice channel (for example, by storing an additional bit or field in the assigned unit's channel status table 150 indicating that it is assigned to update the status of a particular voice channel). Voice channels are assigned arbitrarily to control units 54 for purposes of this status maintenance function (in one exemplary arrangement, each voice channel is assigned to a different control unit). All control units 54 monitor status update control messages and update their channel status table 150 (and if necessary, their Line Control Table 100) in response to the status update messages.

Status update messages are transmitted periodically by each control unit 54 according to an internal timer, such that status update messages are transmitted independently and not all at once. Even though status update messages are sporadically received in a random order, every active control unit 54 of system 50 assigned to update the status of a line and/or channel sends at least one status update message during a given period of time (e.g., 15 minutes). Thus, a failed control unit 54 which is palced back into service automatically corrects its stored line and channel status information in response to status update messages received gradually over a period of time.

Figure 8C:
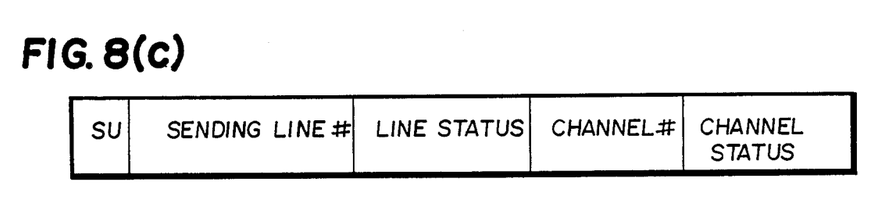
FIG. 8C is a schematic diagram of an exemplary status update message format in accordance with the present invention.

FIG. 8C is a schematic diagram of an exemplary status update control message format sent periodically by control units 54 shown in FIG. 2. The status update control message of the preferred embodiment includes an action code field designating status update (e.g., "SU"); a sending line number field containing the line number the status of which is being updated (e.g., the "home" line number of the transmitting control unit); a line status field containing the status of the line being updated (e.g., idle or busy); the voice channel number of the channel assigned to the transmitting control unit 54 for purposes of status update; and a channel status field indicating the status (i.e., "busy" or "idle") of the voice channel specified by the contents of the channel number field.

If there are more control units 54 than there are voice channels, channels can be redundantly assigned to control units to insure that the status of a channel will be updated even if one of the control units assigned to update the channel has failed. If desired, status update control messages for particular lines may be sent only by the "home" control unit 54 for the line. Thus, some control units 54 may not originate any status update control messages, but may only receive them. Similarly, some control units 54 might send status update control messages including line status information, but no channel status information. It is necessary and sufficient to assign, for each line of system 50, one control unit 54 to update line status. Similarly, it is necessary and sufficient to assign one control unit 54 for each voice channel to update voice channel status. To reduce system message traffic, it is desirable to assign the update channel status task to only control units 54 already assigned to update line status. In the preferred embodiment, the task of transmitting status updating control messages is distributed throughout system 50 to ensure the status of most channels and most lines are correctly updated despite failure of a large number of control units 54.

Figure 10:
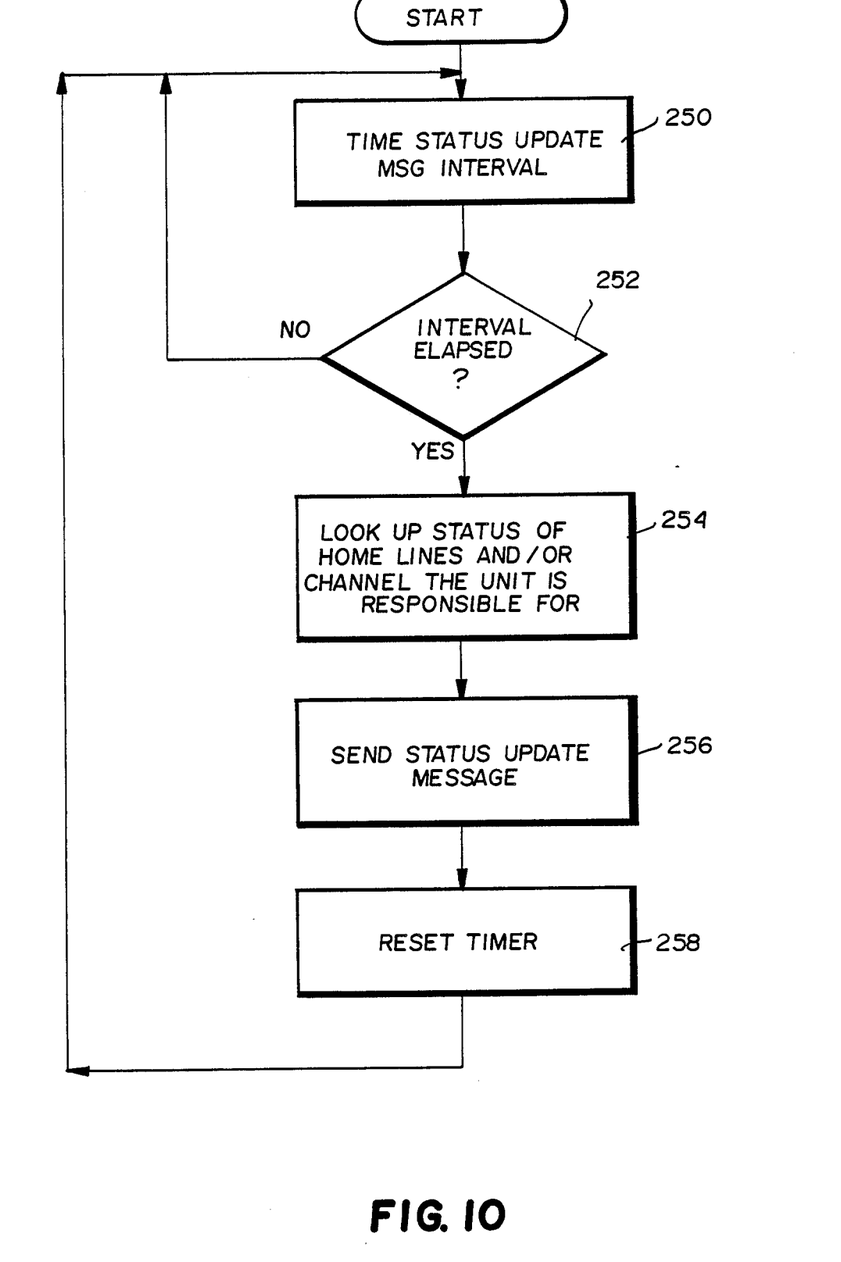
FIG. 10 is a flowchart of some of the exemplary program control steps periodically performed by the control unit shown in FIG. 2.

FIG. 10 is a flowchart of exemplary program control steps performed periodically by the ones of control units 54 charged with originating status update control messages. The processor 15 of each such control unit 54 sets an internal timer (hardware or software) to time a predetermined interval of time (e.g., 15 minutes) (block 250). When the time interval elapses (block 252, which may cause an interrupt trapping to a status update message origination vector performing blocks 254–258), the control unit 54 looks up the current status of its home line(s) in its line control table 100 and/or looks up the status of the voice channel assigned to the unit for purposes of status update in its channel status table 150 (block 254). Control unit 54 then transmits the line and/or channel status information along with a "status update" action code in a status update control message having the format shown in FIG. 8c (block 256). Control unit 54 then resets its internal timer (block 258) and waits for the predetermined interval to elapse once again (blocks 250, 252) preferably by a return from interrupt command).

Sometimes, a control unit 54 which has become unsynchornized will attempt to update the status of a voice channel with erroneous channel status information. For example, a control unit 54 assigned to periodicallyupdate the status of voice channel X may miss receiving a message from another control unit establishing communications over voice channel X. The control unit 54 charged with updating the status of voice channel X determines, by referring to its own channel status table 150, that channel X is idle when the channel is in fact busy. The control unit 54 sends a status update control message updating the status of the voice channel to "idle", which information is stored into the channel status table 150 of all of the other control units 54 of system 50.

In the preferred embodiment, control units 54 receive messages even when engaged in communication via voice channels. The further control units 54 actually engage in communication via voice channel X receive the status update command message originated by the control unit assigned to update the status of voice channel X, and determine that the status update message conflicts with their own use of the voice channel (see decision block 208 shown in FIG. 9). These further control units 54 themselves originate a status update command message specifying the status of channel X as busy, thereby correcting the channel status tables 150 of the remainder of control units 54 (including the control unit assigned to update the status of voice channel X) (block 210 shown in FIG. 9).

Hence, control units 54 which "know" (due to their own voice channel usage) that a voice channel is busy broadcast a further update status message in response to an incorrect status update message, thereby ensuring that no busy channel is falsely marked as idle. Similar arrangements are possible to prevent idle voice channels from being incorrectly updated as "busy" (e.g., by having the control unit 54 assigned to update the status of a voice channel periodically poll the control units supposedly using the voice channel for communications).

Because the preferred embodiment does not use acknowledgement messages, message traffic volumes are greatly reduced as compard with distributed telephone systems requiring acknowledgements for every message. The present invention also eliminates the need for maintaining extensive status tables in each control unit, thus reducing memory requirements and status maintenance processing time. A control unit can re-start autonomously in the present invention after being disconnected from system 50, since all the information needed to correctly update its status is made available periodically by the other control units. Status update message traffic load is constant, even during periods when one or most control units are resynchronizing after losing synchronization (e.g., after a power failure). The periodic status update messages only incrementally increase the message traffic of system 50 and accound for far less traffic than would be generated by simple acknowledgements.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A method of updating a plurality of programmable telephone units in a distributed telephone system, said method comprising the steps of:
    (1) storing information in a first telephone unit indicating the instantaneous status of a preset, randomly-assigned one of a plurality of communication channels;
    (2) receiving, with said first telephone unit, information transmitted over a control communications channel by a further telephone unit indicating a change of status of said preset channel;
    (3) updating said stored status-indicating information in response to said received status information; and
    (4) periodically transmitting said stored status-indicating information from said first telephone unit to said plurality of units over said control channel.

2. A telephone unit comprising:
    transceiver means, coupled to plural further telephone units, for transmitting information to and/or receiving information from said further units over a communications channel selected from a plurality of such channels;
    storing means for storing data designating a preset, randomly-assigned one of said plurality of communications channels; and
    control means, connected to said transceiver means and said storing means, for maintaining data indicating the instantaneous status of said preset communications channel in response to information transmitted by said further units and received by said transceiver means and for controlling said transceiver means to periodically transmit said maintained data to said further telephone units.

3. in a distributed telephone system including plural independent telephone units each having transceiving means for transmitting signals to and/or receiving signals from others of said plural telephone units over available communications channels selected from plural such communications channels, a method of updating said telephone units with current status information comprising the steps of:
    (1) storing data in each telephone unit indicating the availability/unavailability of said plural communications channels;
    (2) selecting an available communications channel in response to said availability/unavailability indicating data stored in a first telephone unit;
    (3) transmitting control signals from said first telephone unit indicating said selected communicatios channel is unavailable;
    (4) transmitting signals between said first telephone unit and a second telephone unit over said selected communications channel;
    (5) updating the data stored in each of said plural telephone units in response to said control signals transmitted by said transmitting step (3);
    (6) periodically transmitting signals indicating the availability/unavailability of said selected communications channel from a preassigned telephone unit different from said first and said second telephone units in response to the channel availability/unavailability data stored in said preassigned telephone unit as updated by said updating step (5); and
    (7) updating the data stored in each of said plural telephone units in response to said signals transmitted by said transmitting step (6).

4. A method as in claim 3 further including the steps of:
    (8) transmitting signals indicating the unavailability of said selected communications channel from at least one of said first and said second telephone units if said signals transmitted by said transmitting step (6) indicate said selected communications channel is available; and
    (9) updating the data stored in each of said plural telephone units in respone to said signals transmitted by said transmitting step (8).

5. A method as in claim 3 further including the steps of:
    (10) ceasing to transmit signals between said first telephone unit and said second telephone unit over said selected communications channel;
    (11) transmitting control signals from at least one of said first and second telephone units indicating said selected communications channel is available; and
    (12) updating the data stored in each of said plural telephone units in response to said control signals transmitted by said transmitting step (11).

6. A method as in claim 3 further including the steps of
    (a) periodically transmitting, from each of said plural units, signals indicating the instantaneous status thereof; and
    (b) updating, in response to signals transmitted by said transmitting step(a), data stored in each of said plural units indicating the status of others of said plural units.

7. A method as in claim 1 wherein said transmitting step (4) includes periodically transmitting a status update control message including an action code field designating status update; a voice channel number field designating said preset channel; and a channel status field indicating whether said preset channel is busy or idle.

8. A method as in claim 7 wherein said status update control message transmitting step further includes transmitting a line number field designating a preset line corresponding to said first telephone unit; and a line status field indicating whether said preset line is busy or idle.

9. A method as in claim 8 wherein said preset line is preassigned to said first telephone unit.

10. A method as in claim 1 wherein said storing step (1) includes storing a channel status table 150 in said first unit, said table 150 including fields designating each of said plurality of channels and associated corresponding fields indicating the status of said plurality of channels.

11. A method as in claim 1 further including:
    (a) independently storing further information in each of said plurality of telephone units indicating the instantaneous statuses of said plurality of communication channels; and
    (b) independently updating said further information in response to status information received over said control channel from further telephone units indicating a change in channel status and also in response to said status-indicating information periodically transmitted by said transmitting step (4).

12. A method as in claim 11 wherein said storing step (b) includes maintaining a channel status table 150 in each of said plurality of telephone units, said table 150 including fields designating each of said plurality of channels and associated corresponding fields indicating the instantaneous statuses of said channels.

13. A method as in claim 1 wherein
said method further includes periodically timing a preset time interval with said first telephone unit; and
said transmitting step (4) performed inresponse to expiration of said time interval.

14. A telephone unit as in claim 2 wherein said control means controls said transceiver means to periodically transmit a status update control message including an action code field designating status update, a voice channel number field designating said preset channel, and a channel status field indicating whether said preset channel is busy or idle.

15. A telephone unit as in claim 2 wherein:
said storing means also stores, in said storing means, data indicating a preset line assigned to said telephone unit; and
said control means also controls said transceiver means to periodically transmit a line number field designating said preset line and a line status field indicating whether said preset line is busy or idle.

16. A telephone unit as in claim 2 wherein said storing means also sotres a channel status table 150, said table 150 including fields designating each of said plurality of channels and associated corresponding fields indicating the status of each of said channels.

17. A telephone unit as in claim 2 wherien:
said telephone unit further comprises timing means for periodically timing a preset time interval; and
said control means is connected to said timing means and controls said transceiver means to transmit said maintained data upon expiration of said preset time interval.

18. A distributed telephone system including:
a plurality M of independent telephone units, each unit including a signal transceiving means for transmitting signals to and/or receiving signals from others of said plurality of telephone units over available channels selected from a plurality n of channels;
each of said plurality M of telephone units including means for storing a status table 150, said table including N status fields associated with and corresponding to said plurality N of channels indicating the available/busy status of said channels;
each of said plurality M of telephone units including control means, connected to an associated transceiving means and storing means, for updating said stored status table status fields in response to received signals transmitted over said channels by others of said telephone units, said control means for controlling said transceiver means to transmit, to the other telephone units, signals indicating change in usage of a channel by the transmitting telephone unit,
a subset of said plurality M of telephone units being assigned to a corresponding plurality of said channels, the control means of said assigned telephone units also for controlling said transceiver means connected thereto to periodically transmit the available/busy status of the channels assigned thereto to the other telephone units.

19. A system as in claim 18 wherein said subset of telephone units are randomly assigned to said corresponding plurality of channels.

20. A system as in claim 18 wherein:
each of said assigned telephone units includes timing means, connected to said control means, for periodically timing a predetermined time interval; and
said control means controls said transceivers of said subset of response units to transmit said status upon each periodic expiration of said time interval.

21. A system as in claim 18 wherein:
said plurality M of telephone units are members of groups designated by line numbers;
the means of one unit in each group also controls its associated transceiver means to periodically transmit signals to the other telephone units indicating the status of the groupit is a member of; and
said subset of telephone units is assigned so that the telephone units periodically transmitting signals indicating groupstatus also periodically transmit signals indicating channel status.

22. A method of updating a plurality of programmable telephone units in a distributed telephone system, said method comprising the steps of:
(1) associating a first telephone unit with a corresponding line designation;
(2) temporarily assigning a communication channel to said line designation;
(3) storing information in said first telephone unit indicating the instantaneous assigned/unassigned status of said line designation;
(4) receiving, with said first telephone unit, information transmitted over a control communication channel by a further telephone unit also associated with said line designation indicating a change of assigned/unassigned status of said line designation;
(5) updating said status-indicating information stored in said first telephone unit in response to said received status information; and
(6) periodically transmitting said stored status-indicating information from said first telephone unit to said plurality of units over said control channel.

23. A method as in claim 22 wherein said transmitting step (5) includes periodically transmitting a status update message having a line number field specifying said line designation and a line status field indicating whether a channel is assigned to said line designation.

24. A method as in claim 22 wherein said transmitting step (5) is performed periodically upon expiration of a predetermined time interval even when no channel is assigned to said line designation during said time interval.

* * * * *